United States Patent
Lechner

[19]

[11] Patent Number: 6,009,085
[45] Date of Patent: Dec. 28, 1999

[54] ARRANGEMENT FOR THE SYNCHRONIZATION OF THE RADIO TRANSMISSION IN A RADIOTELEPHONE SUBSCRIBER CONNECTION NETWORK

[75] Inventor: Robert Lechner, Boeheimkirchen, Austria

[73] Assignee: Siemens Aktiengesellschaft, Munich, Germany

[21] Appl. No.: 08/680,928

[22] Filed: Jul. 16, 1996

[30] Foreign Application Priority Data

Jul. 21, 1995 [DE] Germany ............................ 195 26 779

[51] Int. Cl.⁶ ..................................................... H04J 3/16
[52] U.S. Cl. ............................................ 370/324; 370/347
[58] Field of Search ..................................... 370/324, 312, 370/318, 326, 328, 329, 337, 347, 349, 350, 507, 503, 310, 314, 321, 316, 341, 345, 442, 465, 455; 375/355, 356; 455/3.2, 5.1, 427, 422, 455, 456, 515, 502, 525

[56] References Cited

U.S. PATENT DOCUMENTS 5,365,516 11/1994 Jandrell .................................. 370/337
5,483,530 1/1996 Davis et al. ............................. 370/465
5,526,357 6/1996 Jandrell .................................. 370/340

FOREIGN PATENT DOCUMENTS 42 15 730 A1  11/1993  Germany.

*Primary Examiner*—Dang Ton
*Attorney, Agent, or Firm*—Hill & Simpson

[57] ABSTRACT

The arrangement synchronizes the radio transmission in a radiotelephone subscriber connection network. The connection network for the subscriber connection to the telecommunication exchange (LE) is divided into a central control unit (RDU), at least one concentrating, decentralized unit (RBC), as well as a plurality of base stations (RBS) between which and subscriber stations the radio transmission to be synchronized occurs. The decentralized units contain receivers (GPS-E) for reference signals of a radio-locating system, for example GPS, beamed out by satellites and derive time signals therefrom for the time-division multiplex radio frame of the base stations that they transmit thereto via a U-interface (U).

10 Claims, 2 Drawing Sheets

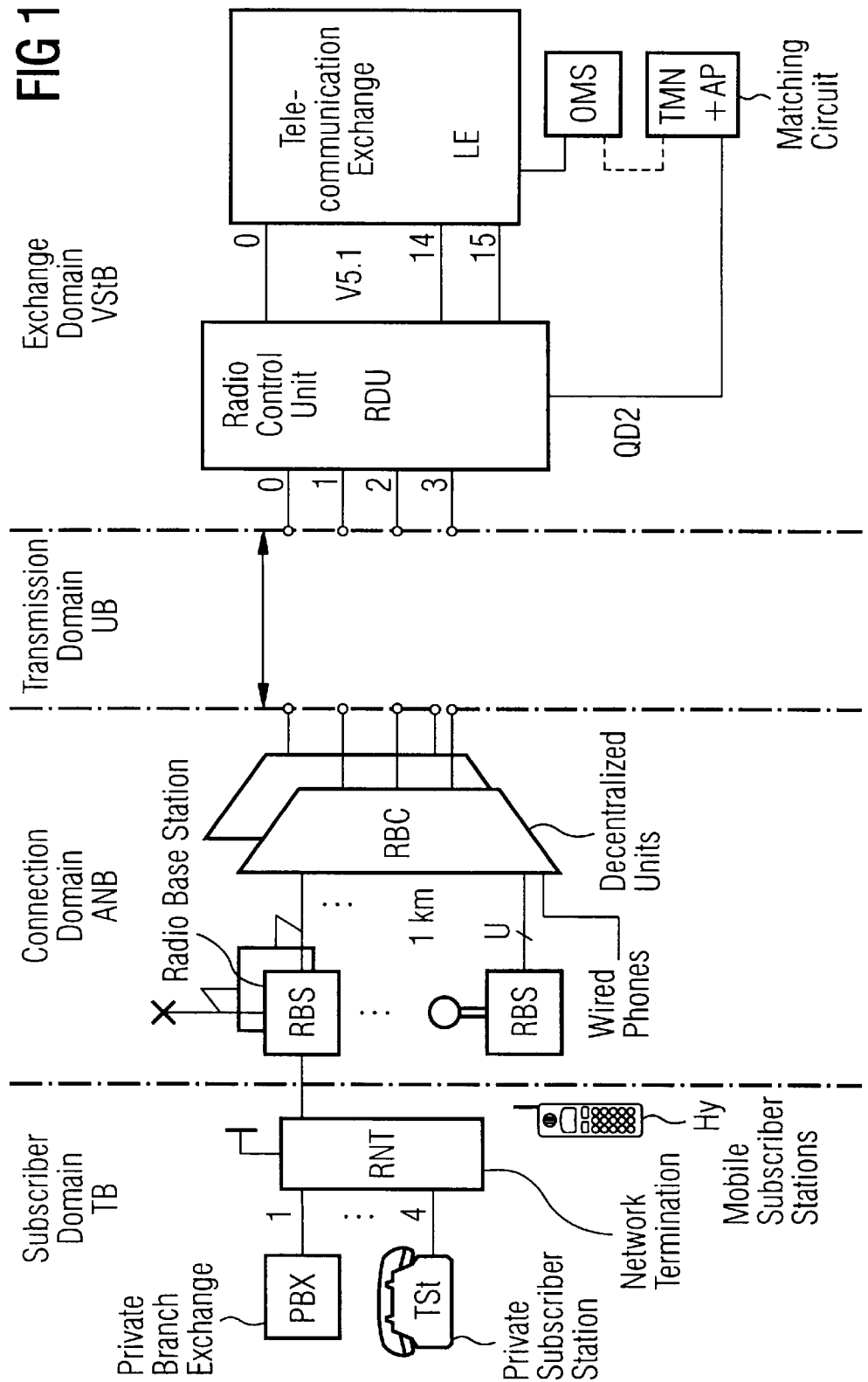

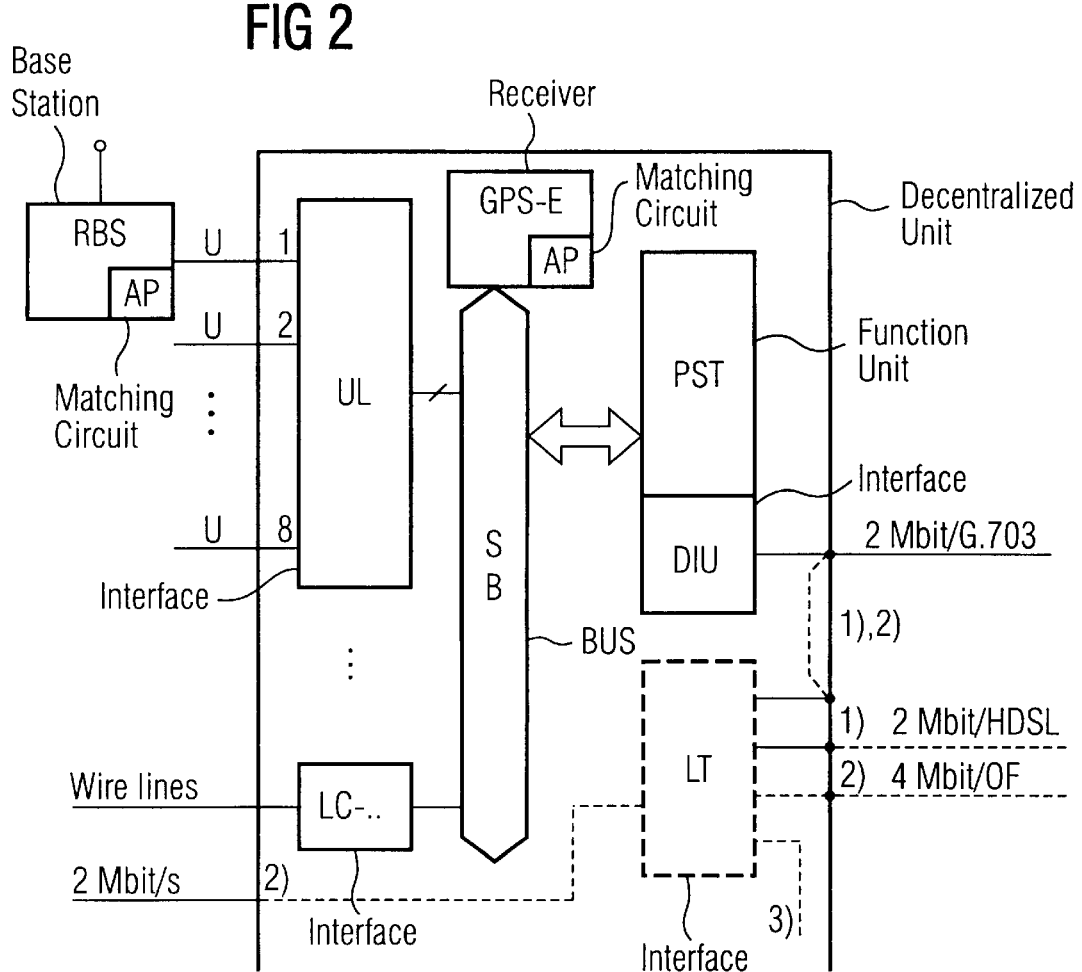

ARRANGEMENT FOR THE SYNCHRONIZATION OF THE RADIO TRANSMISSION IN A RADIOTELEPHONE SUBSCRIBER CONNECTION NETWORK

BACKGROUND OF THE INVENTION

The present invention is directed to an arrangement for synchronization of radio transmission in a radiotelephone subscriber connection network for connection to a telecommunication exchange.

What is accordingly involved is the synchronization in a radiotelephone subscriber connection network that has a central unit serving for the control of the radiotelephone system, a least one decentralized concentrating unit, as well as a plurality of base stations connected to these decentralized units via a U-interface, the radio transmission ensuing between the base stations and subscriber stations.

In a radiotelephone subscriber connection network that operates according to the DECT standard (Digital European Cordless Telecommunication), there is a multi-cellular structure, that is, each of the base stations forms the center of a proper cell, whereby the coverage of these base station cells and the spatial arrangement of the base stations are selected such that an overall region is covered gap-free. When the individual base stations do not operate synchronously, interference arises at the boundaries of the cells, overlaps being unavoidable thereat, with the consequence that the spectral efficiency, that is, the possibility of multiple utilization of one and the same frequency for different connections, is reduced. There is therefore particular interest in a synchronization of the operation of the base stations.

It is also provided according to the DECT standard that the mobile terminal equipment that are in radio communication with the base stations constantly check the quality of the radio channel employed during an existing connection and additionally check the quality of all other, free radio channels. Also, a change of channels (which should occur completely unnoticed) is initiated using the base stations when one of the remaining free channels has better quality than the channel used at the moment. Such a "handover" can also ensue in such a way that a channel switch occurs from a channel of the cell of a first base station to a channel of the cell of a neighboring base station. In this case, it must be assumed that the base stations also work time-synchronized in view of an interruption free handover.

SUMMARY OF THE INVENTION

It is an object of the present invention to assure synchronous operation of the base stations in an efficient way given a radiotelephone subscriber connection network having the recited structure.

In general terms the present invention is an arrangement for the synchronization of radio information transmission in a radiotelephone subscriber connection network for connection to a telecommunications exchange that is composed of a central unit for controlling the radiotelephone system. At least one decentralized, concentrating unit, as well as a plurality of base stations connected to the at least one decentralized unit via a U-interface (U). Radio transmission ensues between the base stations and subscriber stations. the decentralized units contain receivers for reference signals of a radio-locating system beamed out by satellites. They derive time signals from these reference signals for the time-division multiplex frames of the base stations that they send to the base stations via the U-interface.

Advantageous developments of the present invention are as follows.

The radio-locating system is the global positioning system.

The receivers of the decentralized units contain a matching circuit for coarse adjustment of a time offset for ta starting point in time of a time-division multiplex radio frame. The base stations have a matching circuit for the fine adjustment of such a time offset.

The receivers of the decentralized equipment also derive time signals for the assemblies contained in them from the received reference signal of the radio-locating system.

Accordingly, use is made of the reference signals that are beamed out by satellites of a radio-locating system, specifically what is referred to as the GPS system (Global Positioning System). Appropriate receivers are arranged in the decentralized units that derive time signals for the time-division multiplex radio frame of the base station from these reference signals and transmit these time signals to the base stations via the respective U-interface.

Since the distance of the base stations from the decentralized unit to which they are connected are different, differences in transit time must be taken into consideration. This inventively occurs in that the receivers contained in the decentralized units have a matching circuit with a corresponding time offset for the starting point in time of the appertaining time-division multiplex radio frame is defined in a rough setting for taking the respective transit time into account, and in that the base stations respectively comprise a matching circuit for the fine adjustment of the respective time offset.

According to a further development of the present invention, the receivers of the decentralized equipment also derive time signals for the assemblies contained in them from the received reference signal of the radio-locating system, as a result whereof the technical realization of these decentralized equipment is simplified.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 is an overview of a radiotelephone subscriber connection network to which the present invention is applied;

FIG. 2 is a detailed illustration of a decentralized, concentrating unit of such a connection network; and FIGS. 3(a–c) are a time diagram of the time frame critical for the base stations of such a connection network.

DESCRIPTION OF THE PREFERRED EMBODIMENTS

The radiotelephone subscriber connection network of FIG. 1 is divided into an exchange domain VStB, a transmission domain UB, a connection domain ANB and a subscriber domain TB. As shown in the subscriber domain TB, private branch exchanges PBX or private subscriber stations TSt that are connected via two-wire lines to stationary subscriber network terminations RNT can be provided as subscribers that are connected to a telecommunication exchange LE of the exchange domain VStB. A radio link that bridges a distance on the order of magnitude of a few kilometers exists between such subscriber network terminations RNT and radio base stations RBS belonging to the connection domain ANB. Mobile subscriber stations HY also come into consideration, these being capable of entering directly into radio communication with said base stations RBS.

The base stations RBS are combined into groups (into two groups in the illustrated case) in that they are connected via two-wire lines and a U-interface U to concentrating, decentralized units RBC1 or RBC2 of the connection network. The decentralized units respectively concentrate the traffic deriving from the connected base stations onto at least one transmission link that is a component part of the domain UB and on which information transmissions ensue with a bit rate of 2 Mbit/s. These transmission links are a matter of radio links or of optical fiber links or of copper lines in instances wherein only relatively shorts distances to the telecommunication exchange LE are to be bridged. A radio control unit RDU is arranged in the near range of the telecommunication exchange, that is, in the exchange domain VStB, as central unit of the connection network. Two-wire line connections via V5-interfaces exist between the central unit RDU and the telecommunication exchange LE.

As shown in FIG. 2, the decentralized units RBC inventively have a receiver GPS-E for the reference signals of a radio-locating system, preferably the aforementioned GPS system, that are beamed out by satellites. A function unit PST of this unit RBC derives time signals for the time-division multiplex frame of the base stations RBS from the clock and time signals supplied by the receiver in conformity with the reference signals. These time signals are forwarded to the connected base stations RBS via a system bus SB and an interface unit UL belonging to the U-interface.

Dependent on the type of GPS receiver, the binding thereof to the function unit PST can also ensue via a serial interface. Via this interface, the function unit then also implements setting and monitoring functions for the GPS receiver GPS-E. It thereby also reads the "universal time" that is reached with the next-successive time mark that the GPS receiver outputs.

As a component part of the unit RBC, FIG. 2 also indicates an interface DIU for the connection of the transmission link of the transmission domain UB, as well as, interface circuits LC for subscriber connection via copper lines, for example an ISDN basic access. Further, the Figure also shows an interface unit LT for the direct connection of the unit RBC via 2 Mbit/s lines that, dependent on the nature of the transmission link of the transmission domain UB, represent an electrical or an optical interface.

The time frames critical for the base stations RBS are shown in FIGS. 3(a–c). These are: according to line a), a sampling frame for the time-division multiplex channels of the radiotelephone system that, for example, comprises 100 ms; according to line b), a signalling frame of, for example, 160 ms; and, according to line c), a time frame of, for example, 6 ms used for internal purposes of the base station.

A synchronism of the time relationships of the base stations RBS with respect to the smallest common multiple of said time frames is now produced by the time signals derived from the reference signal of the radio-locating system, this amounting to 2400 ms in the case under consideration.

Since connecting lines between the base stations RBS and the decentralized equipment RBC of the connection network leading across the U-interfaces are different, differences in transit time must be taken into account. This inventively occurs in that the time-division multiplex time frame critical in the base stations, that is, the frame according to line a) in FIG. 3, is given a corresponding time offset. A rough adjustment of this time offset ensues in the decentralized units RBC, to which end the receivers GPS-E provided thereat comprise a corresponding matching circuit AP; the fine adjustment then ensues in the base stations RBS, which likewise comprise a corresponding matching circuit. It is thus possible that, for example, two operators synchronize their networks in the radio domain and, thus, minimize the interference.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. An arrangement for synchronization of radio information transmission in a radiotelephone subscriber connection network for connection to a telecommunications exchange that is composed of a central unit for controlling of a radiotelephone system of the connection network, at least one decentralized concentrating unit, and a plurality of base stations connected to said at least one decentralized unit via a U-interface, radio transmission ensuing between said base stations and subscriber stations, comprising: decentralized units having receivers for receiving reference signals of a radio-locating system beamed out by satellites; the decentralized units having function units for deriving time signals from the reference signals for time-division multiplex frames of the base stations that the decentralized units send to the base stations via the U-interface.

2. The arrangement according to claim 1, wherein the radio-locating system is a global positioning system.

3. The arrangement according to claim 1, wherein the receivers of the decentralized units have matching circuits for coarse adjustment of a time offset for a starting point in time of the time-division multiplex radio frames; and wherein the base stations have matching circuits for fine adjustment of said time offset.

4. The arrangement according to claim 1, wherein the receivers of the decentralized unit also derive time signals for assemblies contained therein from the received reference signal of the radio-locating system.

5. A radiotelephone subscriber connection network for synchronization of radio information transmission to a telecommunications exchange, comprising:
a central unit for controlling a radiotelephone system;
at least one decentralized concentrating unit;
a plurality of base stations connected to said at least one decentralized unit via a U-interface;
subscriber stations with radio transmission ensuing between said base stations and subscriber stations;
decentralized units having receivers for receiving reference signals of a global positioning system beamed out by satellites;
the decentralized units having function units for deriving time signals from the reference signals for time-division multiplex frames of the base stations that the decentralized units send to the base stations via the U-interface.

6. The radiotelephone subscriber connection network according to claim 5, wherein the receivers of the decentralized units have matching circuits for coarse adjustment of a time offset for a starting point in time of the time-division multiplex radio frames; and wherein the base stations have matching circuits for fine adjustment of said time offset.

7. The radiotelephone subscriber connection network according to claim 5, wherein the receivers of the decentralized equipment also derive time signals for assemblies contained therein from the received reference signal of the radio-locating system.

8. A radiotelephone subscriber connection network for synchronization of radio information transmission to a telecommunications exchange, comprising:

a central unit for controlling a radiotelephone system;

at least one decentralized concentrating unit;

a plurality of base stations connected to said at least one decentralized unit via a U-interface;

subscriber stations with radio transmission ensuing between said base stations and subscriber stations;

decentralized units having receivers for receiving reference signals of a radio-locating system beamed out by satellites;

the decentralized units having function units for deriving time signals from the reference signals for time-division multiplex frames of the base stations that the decentralized units send to the base stations via the U-interface;

the receivers of the decentralized units having matching circuits for coarse adjustment of a time offset for a starting point in time of the time-division multiplex radio frames; and the base stations have matching circuits for fine adjustment of said time offset.

9. The radiotelephone subscriber connection network according to claim 8, wherein the radio-locating system is a global positioning system.

10. The radiotelephone subscriber connection network according to claim 8, wherein the receivers of the decentralized equipment also derive time signals for assemblies contained therein from the received reference signal of the radio-locating system.

* * * * *